United States Patent
Kirby

(10) Patent No.: US 7,921,652 B2
(45) Date of Patent: Apr. 12, 2011

(54) AEROENGINE BLEED VALVE

(75) Inventor: Stuart James Kirby, Derby (GB)

(73) Assignee: Rolls-Royce PLC, London (GB)

(*) Notice: Subject to any disclaimer, the term of this patent is extended or adjusted under 35 U.S.C. 154(b) by 914 days.

(21) Appl. No.: 11/812,922

(22) Filed: Jun. 22, 2007

(65) Prior Publication Data

US 2008/0016878 A1  Jan. 24, 2008

(30) Foreign Application Priority Data

Jul. 20, 2006 (GB) .................... 0614360.6

(51) Int. Cl.
*F02C 6/04* (2006.01)

(52) U.S. Cl. ............................ 60/782; 60/785; 415/119

(58) Field of Classification Search .................. 60/782, 60/785; 415/119, 144; 181/213; 138/40
See application file for complete search history.

(56) References Cited

U.S. PATENT DOCUMENTS

| | | | | | |
|---|---|---|---|---|---|
| 4,537,277 | A | * | 8/1985 | Bryce | 181/214 |
| 5,351,473 | A | * | 10/1994 | Shuba | 60/782 |
| 6,565,313 | B2 | * | 5/2003 | Nikkanen et al. | 415/144 |
| 6,588,195 | B2 | * | 7/2003 | Negulescu | 60/785 |
| 6,981,842 | B2 | * | 1/2006 | D'Angelo et al. | 415/144 |
| 7,387,489 | B2 | * | 6/2008 | Appleby et al. | 415/144 |
| 7,730,995 | B2 | * | 6/2010 | Hunt et al. | 181/213 |
| 2005/0019156 | A1 | * | 1/2005 | D'Angelo et al. | 415/144 |
| 2007/0261410 | A1 | * | 11/2007 | Frank et al. | 60/785 |
| 2008/0050218 | A1 | * | 2/2008 | Sokhey | 415/119 |
| 2009/0188257 | A1 | * | 7/2009 | Kirby | 60/785 |
| 2010/0043447 | A1 | * | 2/2010 | Kirby | 60/785 |
| 2010/0115963 | A1 | * | 5/2010 | Kirby | 60/785 |
| 2010/0115964 | A1 | * | 5/2010 | Kirby | 60/785 |

FOREIGN PATENT DOCUMENTS

| | | |
|---|---|---|
| EP | 1 300 567 A2 | 4/2003 |
| GB | 2 132 269 A | 7/1984 |
| GB | 2 405 666 A | 3/2005 |
| WO | WO 96/11340 A1 | 4/1996 |

OTHER PUBLICATIONS

"The Jet Engine", 5th Edition, 1986, Rolls-Royce plc, pp. 28-33.

* cited by examiner

*Primary Examiner* — William H Rodríguez
(74) *Attorney, Agent, or Firm* — Oliff & Berridge, PLC

(57) ABSTRACT

A bleed valve (30) for a gas turbine engine (10) comprises a diffuser (50), through which heated compressor bleed air flows (54) into a bypass duct (22) air stream (B), has a plurality of small holes (40). The plurality of holes (40) is divided into two or more arrays of holes ($52_{p,q,r}$), each array of holes ($52_{p,q,r}$) is angled ($\delta$) away from one another so that their respective bleed flows ($54_{p,q,r}$) do not coalesce. This separation improves mixing with the air stream (B) and helps prevent hot bleed air damaging nacelle and other engine components.

17 Claims, 3 Drawing Sheets

AEROENGINE BLEED VALVE

The present invention relates to a bleed valve assembly for a gas turbine engine and particularly but not exclusively for releasing compressed air from a compressor into a bypass duct of the engine.

BACKGROUND

The use and configuration of bleed valves are well known in gas turbine engines and are usually used to improve engine operability particularly for the engine's compressors. In use heated air at high pressure passes from a compressor, through a bleed valve and via a diffuser into a main gas stream. The compressor may be either an intermediate or high pressure compressor with temperatures of exhausted gas may be up to 400° C. The diffuser is usually a domed plate comprising an array of holes to enhance mixing with the main gas stream, which is usually a cooler bypass flow.

Known bleed valve diffusers, such as installed on the Trent 500 aeroengine of Rolls-Royce™ plc, are designed with the intent to a) attenuate noise produced within the bleed valve; b) produce small separate jets of bleed air (rather than one large one) to increase the jets noise frequency, which is better attenuated within the bypass duct and atmosphere; and c) improve mixing of the hot gases flowing through the bleed valve with the cold bypass flow in order to limit/prevent thermal damage to nacelle and other components.

These diffusers are usually circular domes and have an array of holes where each hole is angled radially so that its air flow jet has both radial and axial velocity components relative to the diffuser's centre-line. Some diffusers, like the Trent 500's, have a number of zones of holes where each zone's holes have different axial angles to the centre-line. Each of these diffusers attempts to spread the flow by pointing each hole (or group of holes) in different directions. This is intended to enhance the mixing of the hot gas passing through the diffuser with the cool bypass flow to reduce its temperature before impinging on thermally sensitive nacelle and/or engine parts. However, it has been found that these prior art diffusers are ineffective because the individual flows from each small hole do not act independently. Although each small gas stream is initially discrete and is directed in a slightly different direction, within a short distance they conglomerate into a single plume. This is because the bypass flow is unable to achieve significant penetration into the mass of individual plumes and so a partial vacuum forms between them. This vacuum causes the plumes to turn until they are pointing in the same direction and thus forms a single plume entity.

Increasing the number of bleed valve assemblies could improve mixing overall, however, this adds significant weight, cost and takes up more space.

SUMMARY

Therefore it is an object of the present invention to provide a diffuser for a bleed valve arranged to improve mixing between hot gases passing therethrough and a main air flow it is vented into.

In accordance with the present invention a gas turbine engine a bleed valve for a gas turbine engine, the valve comprises a diffuser having a plurality of holes through which a bleed fluid flows and into a fluid stream, the diffuser is characterised in that the plurality of holes is divided into two or more arrays of holes an angle therebetween so that their respective bleed flows do not coalesce. The angle is an angle of divergence of the two or more arrays of holes when projected onto a plane perpendicular to the fluid stream.

Preferably, the angle is at least 10 degrees, but may be between 20 and 60 degrees.

Preferably, the holes in any one or more arrays are also angled, upstream or downstream with respect to the fluid stream; the angle is a projected angle onto a plane parallel to the direction of the fluid stream. The angle is at least 10 degrees, but may be between 20 and 60 degrees.

Preferably, most of the holes in any one or more arrays are substantially parallel to one another. Alternatively, at least one of holes in any one or more arrays is angled less than 15 degrees away from the principle direction of its array.

Preferably, the two or more arrays are separated by a width of about 10% of the corresponding width of the diffuser, but may be between zero and 20%.

Preferably, the separation begins at an upstream edge of the diffuser and/or ends at a downstream edge of the diffuser.

Preferably, the separation is substantially aligned with the direction of fluid stream.

Preferably, two or more separations are provided between arrays and may either be aligned with or divergent from the fluid stream.

In another aspect of the present invention, a gas turbine engine comprising an airflow duct, a compressor and a bleed valve arranged to bleed air from the compressor into the duct, the bleed valve comprises a diffuser as claimed in any one of the above paragraphs.

BRIEF DESCRIPTION OF THE DRAWINGS

The present invention will be more fully described by way of example with reference to the accompanying drawings in which.

DETAILED DESCRIPTION OF EMBODIMENTS

Figure 1:
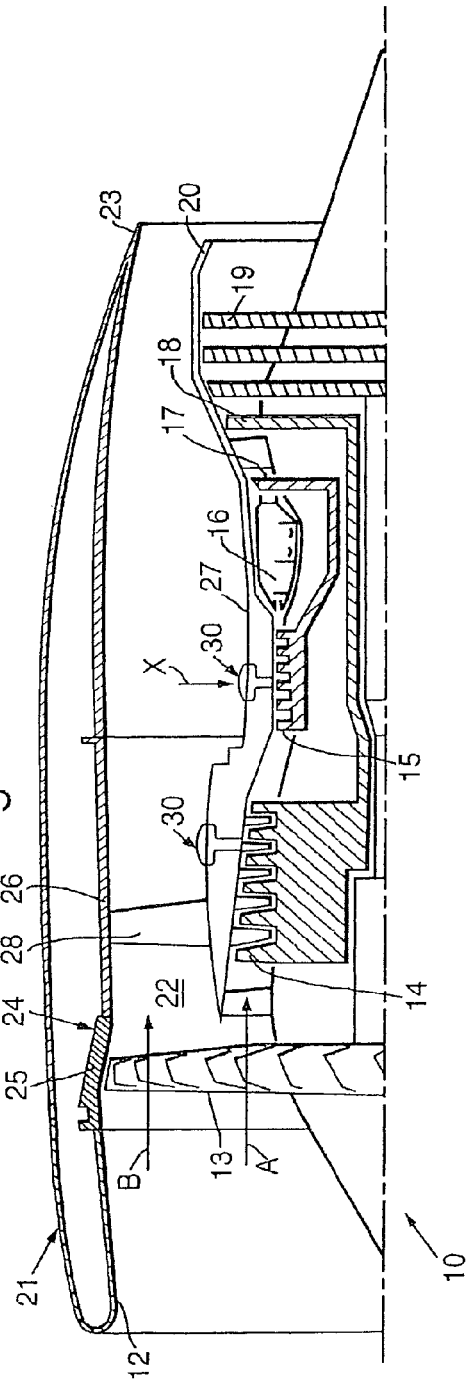
FIG. 1 is a schematic section of part of a ducted fan gas turbine engine and showing a typical location of bleed valves.

Referring to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and a core exhaust nozzle 20. A nacelle 21 generally surrounds the engine 10 and defines the intake 12, a bypass duct 22 and an exhaust nozzle 23.

The gas turbine engine 10 works in the conventional manner so that air entering the intake 11 is accelerated by the fan 13 to produce two air flows: a first airflow A into the intermediate pressure compressor 14 and a second airflow B which passes through the bypass duct 22 to provide propulsive thrust. The intermediate pressure compressor 14 compresses the airflow A directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The fan 13 is circumferentially surrounded by a structural member in the form of a fan casing 24, which is supported by an annular array of outlet guide vanes 28. The fan casing 24 comprises a rigid containment casing 25 and attached rearwardly thereto is a rear fan casing 26.

During engine operations and particularly when changing rotational speed at low power it is important to ensure that the pressure ratio across each compressor 14, 15 remains below a critical working point, otherwise the engine 10 can surge and flow through the engine 10 breaks down. This can cause damage to engine's components as well as aircraft handling problems.

To maintain a preferred pressure difference across a compressor 14, 15, or even just one stage of a compressor 14, 15, bleed assemblies 30 are provided to release pressure from an upstream part of a compressor 14, 15. Operation of a bleed assembly 30 and engine operability are described in "The Jet Engine" 5$^{th}$ Edition, 1986, Rolls-Royce™ plc, pages 28-32, and details of such operation will therefore only be briefly mentioned herein.

Figure 2:
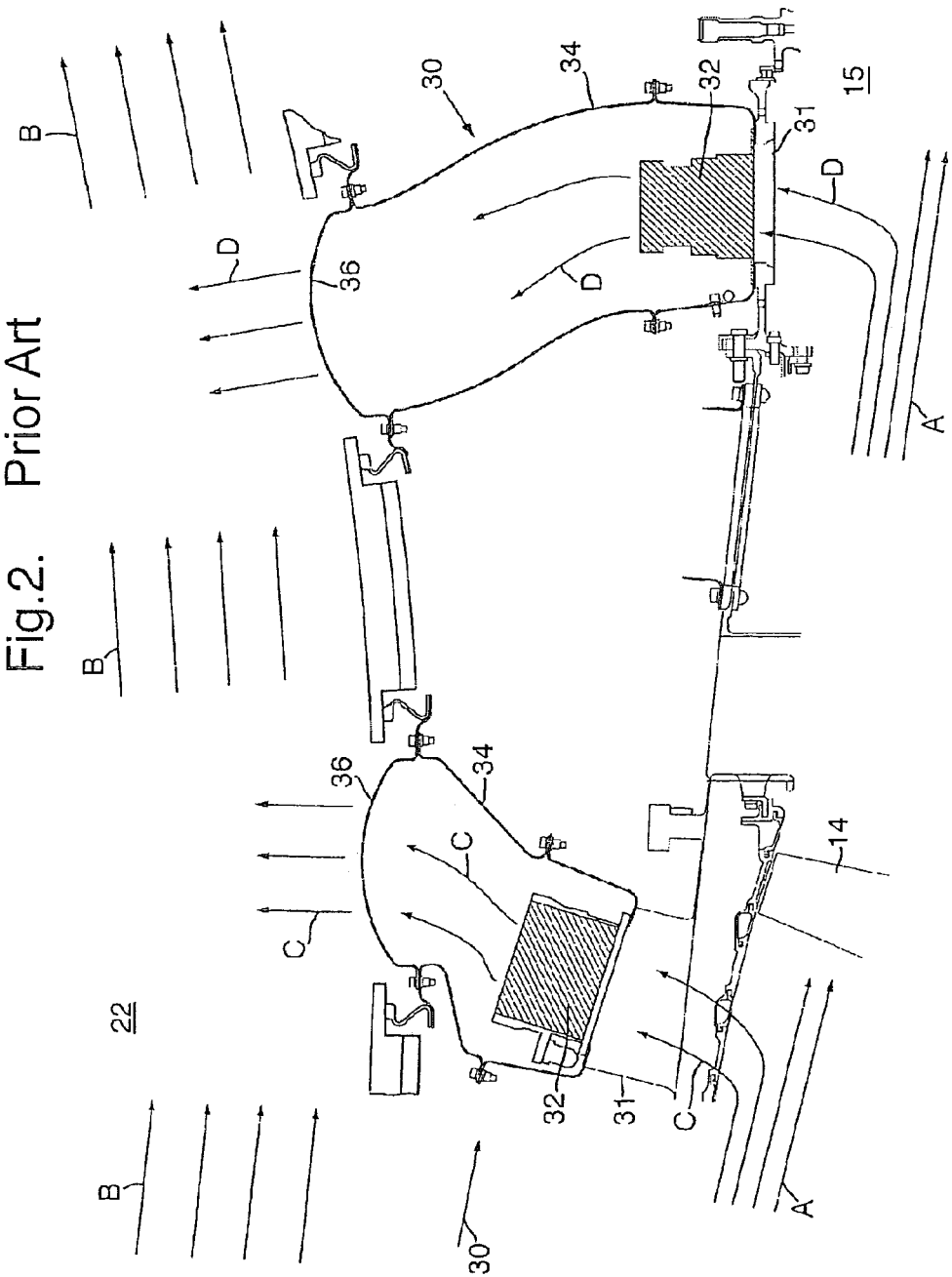
FIG. 2 is a section through part of a gas turbine engine showing a typical bleed valve assembly.

Briefly FIG. 2 shows bleed assemblies 30 associated with the intermediate pressure compressor 14 and high pressure compressor 15. Each bleed assembly 30 comprises an inlet 31 and a bleed valve 32, a duct 34 and a diffuser 36. Parts of core engine airflow A, airflows C and D, may be diverted through the IP and HP bleed assemblies 30, such that each airflow C, D enters the inlet 31, passes through the bleed valve 32 and is channelled by the duct 34 to the diffuser 36. Airflows C and D are then exhausted into the bypass duct 22 where they mix with bypass airflow B as hereinbefore described. There is usually an annular array of bleed valves around the core engine's casing 27.

Figure 4:
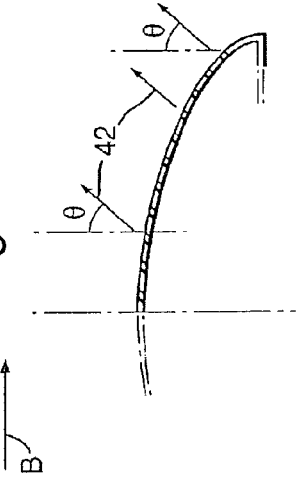
FIG. 4 is a part section through the prior art bleed valve in FIG. 4.
Figure 3:
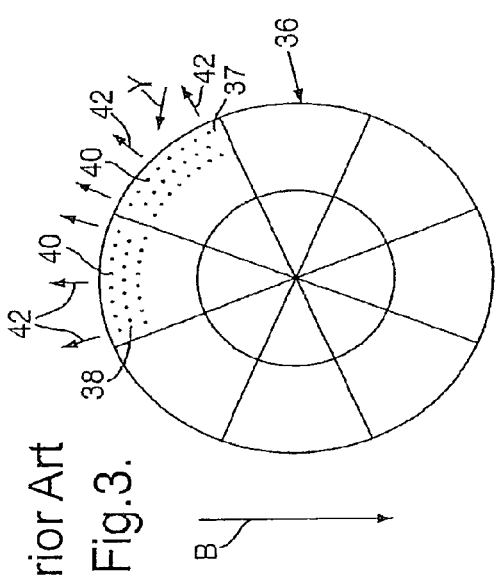
FIG. 3 is a plan view of a prior art bleed valve.

FIGS. 3 and 4 show a prior art diffuser 36 as described in the preamble. The diffuser 36 comprises a plurality of holes 40. Each hole 40 is radially aligned with respect to a centre-line 39 of the diffuser 36. This diffuser 36 comprises a number of zones, two of which are shown 37, 38, and each has an array of holes 40. Within each zone 37, 38 the holes 40 are also angled θ away from the centre-line 39. The angle θ may be between 5 and 65 degrees. It should be well noted, however, that all holes 40 are radially aligned from the centre-line, see arrows 42 indicating the individual radial plumes from each hole 40.

As mentioned in the preamble, it has been found that even these prior art diffusers 36 are not effective at mixing the hot bleed air with the cool bypass air because the individual flows 42 from each small hole 40 do not act independently as desired. Although each small gas stream or jet 42 is initially discrete and is directed in a slightly different direction, within a short distance they conglomerate into a single plume. This is because the main bypass flow B is unable to achieve significant penetration into the mass of individual plumes 42 and so a partial vacuum forms between them. This vacuum causes the individual plumes to turn until they are pointing in the same direction and thus forms a single plume entity, which is less easily mixed with the bypass flow B.

Figure 5A:
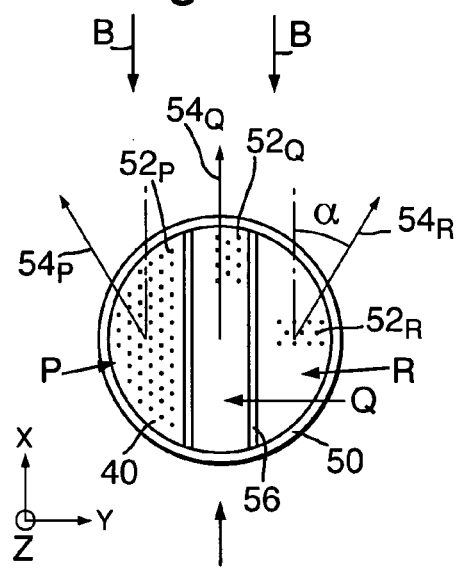
FIGS. 5a-c are views of and sections through a diffuser comprising arrays of holes arranged in accordance with the present invention.
Figure 5B:
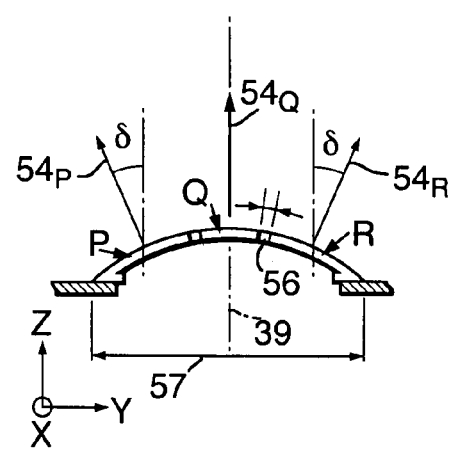
Figure 5C:
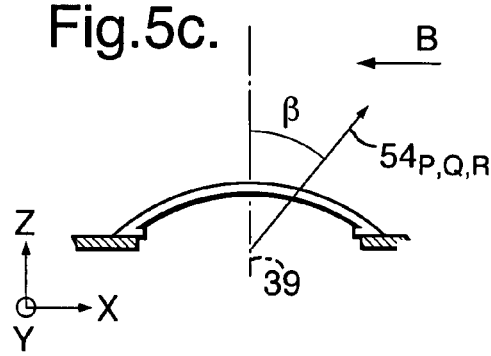

Referring now to the present invention shown in FIGS. 5$a$, 5$b$ and 5$c$, a bleed valve 30 comprises a diffuser 50 having a plurality of holes 40 through which a bleed fluid flows 54 and into the fluid stream B passing through the bypass duct 22. The plurality of holes 40 is divided into three zones P, Q, R having arrays of holes $52_{p,q,r}$. Each array of holes $52_{p,q,r}$ is angled at a first angle δ away from one another so that their respective bleed flows $54_{p,q,r}$ do not coalesce. In FIG. 5$b$, the angle δ is an angle of divergence between the two or more arrays of holes $52_{p,q,r}$ when projected onto a plane perpendicular to the fluid stream B, i.e. the plane YZ. In FIG. 5$b$ the air stream B is into the paper and therefore the perpendicular plane is the plane of the paper. Thus this is the angle of divergence that the air flow B "sees". This is the critical angle and is such that not only do the overall plumes $54_{p,q,r}$ not coalesce, but the airflow B is able to flow between the plumes thereby mixing with them more quickly than would otherwise be the case.

Preferably, the angle δ is at least 10 degrees, however, where a separation 56 is provided between the arrays of holes $52_{p,q,r}$, the angle may be at least 5 degrees. A preferably range of angles δ is between 20 and 60 degrees and the optimum angle for any particular application depends on bypass flow velocity, bleed air velocity and bypass duct size. The angle may be as much as 120 degrees for example, however, with an increase in angle comes greater pressure losses across the holes, a lower mass flow for a given diffuser size and a less rigid diffuser 50 for the same mass flow therethrough.

It is important to note that the angle δ is the angle between adjacent arrays of holes rather than the angle between the direction of the airflow B and the direction of the bleed air flow. Thus for a diffuser with only two arrays, say zones P and R, the angle remains angle δ.

In FIG. 5$c$ the holes in any one or more of the arrays $52_{p,q,r}$ are also angled β upstream with respect to the air stream B. Angle β is the angle when a bleed air jet arrow 54 is projected onto a plane parallel to the bypass airflow B, i.e. the plane XZ. This has the advantage of increasing the time for the hot bleed air to mix with the much cooler bypass air flow B. In other embodiment the holes may be angled downstream or a combination of upstream and downstream, thus further angling the arrays away from one another. The angle β is at least 10 degrees, and preferably between 20 and 60 degrees.

Within each array of holes $52_{p,q,r}$ in each zone P, Q, R most of the holes in any one or more of the arrays $52_{p,q,r}$ are substantially parallel to one another. However, for manufacturing reasons some of the holes in any one or more arrays $52_{p,q,r}$ may be angled less than 10 degrees away from the principle direction of its array. Although the holes in each array may be angled from each other they will coalesce into one plume, however, a slightly enhanced mixing with air stream B will occur.

To further prevent coalescence of the plumes from each array, the diffuser 50 may include a separation 56 between the arrays $52_{p,q,r}$. The width of the separation 56 is approximately 10% of the corresponding width 57 of the diffuser 50. Although the separations 56 may be up to 20%, widths greater than 20% are still within the scope of the invention. Widths significantly greater than 20% disadvantageously increases the size of the diffuser 50 and bleed valve 30. The separations are particularly useful as even with the divergent angle δ the holes of adjacent arrays are close together and may try to coalesce. With the separation there is no chance of coalescence and smaller divergent angles may be used which is particularly useful where there are many arrays of holes.

Figure 6A:
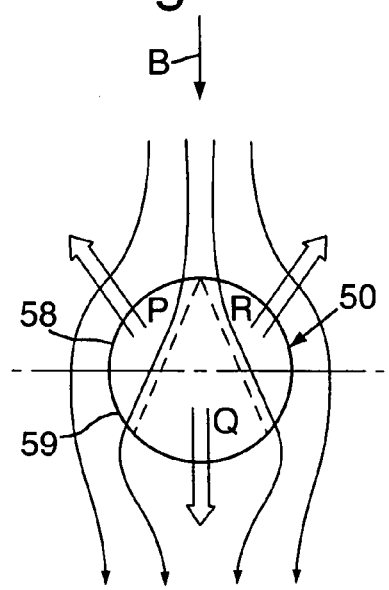
FIGS. 6a-b show separations between arrays of holes and airflow patterns for the diffuser of FIGS. 5a-c in accordance with the present invention.
Figure 6B:
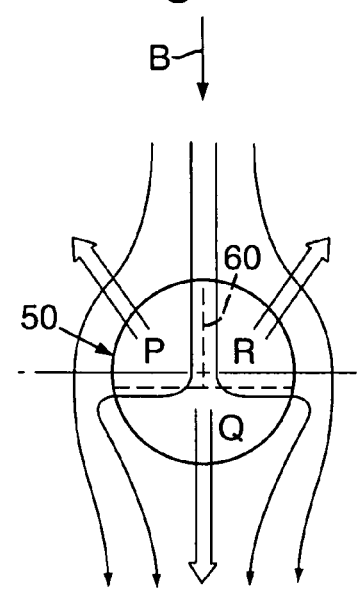

In FIGS. 6a and 6b, the separation 56 is shown to begin at an upstream edge 58 of the diffuser 50 and end at a downstream edge 59. In FIG. 5a the separations 56 are aligned with the direction of air stream B, but in FIG. 6a the separations 56 are divergent in the downstream direction. In this embodiment the plume emanating from the downstream zone Q presents a wide aspect normal to the bypass airflow passing between zones P and R and therefore further promotes mixing.

Various embodiments may be made without departing from the scope of the invention. For example, although the diffuser 50 is shown as circular it may be any other shape such as oval, square, triangular or rectangular. The holes 40 are preferably circular in cross-section, however, they may be elongate slots or other cross-sectional shapes. The bleed valves 30 may discharge gas flows from the engine's compressors or turbines into either a core engine flow or ambient.

I claim:

1. A bleed valve for a gas turbine engine, the bleed valve comprises a diffuser having a plurality of holes through which a bleed fluid flows into a fluid stream,
   wherein the plurality of holes of the diffuser is divided into two or more arrays of holes, each array of holes being adjacent to another array of holes, and adjacent arrays of holes having an angle δ between respective bleed flows of the adjacent arrays of holes so that the respective bleed flows of the adjacent arrays of holes do not coalesce.

2. A bleed valve as claimed in claim 1 wherein the angle δ is an angle of divergence of the two or more arrays of holes when projected onto a plane perpendicular to the fluid stream.

3. A bleed valve as claimed in claim 1 wherein the angle δ is at least 10 degrees.

4. A bleed valve as claimed in claim 3 wherein the angle δ is between 20 and 60 degrees.

5. A bleed valve as claimed in claim 1 wherein the holes in any one or more arrays are also angled β, upstream or downstream with respect to the fluid stream, the angle β being a projected angle onto a plane parallel to the direction of the fluid stream.

6. A bleed valve as claimed in claim 5 wherein the angle β is at least 10 degrees.

7. A bleed valve as claimed in claim 6 wherein the angle β is between 20 and 60 degrees.

8. A bleed-valve as claimed in claim 1 wherein most of the holes in any one or more arrays are substantially parallel to one another.

9. A bleed valve as claimed in claim 1 wherein at least one of holes in any one or more arrays is angled less than 15 degrees away from the principle direction of its array.

10. A bleed valve as claimed in claim 1 wherein the two or more arrays are separated by a separation having a width of about 10% of the corresponding width of the diffuser, the separation having no holes therein.

11. A bleed valve as claimed in claim 1 wherein the two or more arrays are separated by a separation having a width of between zero and 20% of the corresponding width of the diffuser, the separation having no holes therein.

12. A bleed valve as claimed in claim 10 wherein the separation begins at an upstream edge of the diffuser.

13. A bleed valve as claimed in claim 1 wherein a separation ends at a downstream edge of the diffuser, the separation having no holes therein.

14. A bleed valve as claimed in claim 1 wherein a separation is substantially aligned with a direction of the fluid stream, the separation having no holes therein.

15. A bleed valve as claimed in claim 1 wherein two or more separations are provided between arrays, the separations having no holes therein.

16. A bleed valve as claimed in claim 15 wherein the two or more separations are divergent in a downstream direction with respect to the fluid stream.

17. A gas turbine engine comprising an airflow duct, a compressor and a bleed valve arranged to bleed air from the compressor into the duct, wherein the bleed valve comprises a diffuser as claimed in claim 1.

\* \* \* \* \*